US008144974B2

(12) United States Patent
Masuda

(10) Patent No.: US 8,144,974 B2
(45) Date of Patent: Mar. 27, 2012

(54) IMAGE PROCESSING APPARATUS, METHOD, AND PROGRAM

(75) Inventor: Tomonori Masuda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 629 days.

(21) Appl. No.: 12/393,697

(22) Filed: Feb. 26, 2009

(65) Prior Publication Data

US 2009/0214107 A1 Aug. 27, 2009

(30) Foreign Application Priority Data

Feb. 26, 2008 (JP) .................................. 2008-043732

(51) Int. Cl.
*G06K 9/00* (2006.01)

(52) U.S. Cl. ......... 382/154; 382/194; 382/219; 382/220
(58) Field of Classification Search .................. 382/154, 382/236, 193, 194, 203, 204, 205, 206
See application file for complete search history.

(56) References Cited

U.S. PATENT DOCUMENTS

| 6,366,691 | B1 | 4/2002 | Sogawa | |
|---|---|---|---|---|
| 2005/0163366 | A1 | 7/2005 | Zhang et al. | |
| 2006/0098896 | A1* | 5/2006 | Pishdadian et al. | 382/286 |
| 2008/0018595 | A1* | 1/2008 | Hildreth et al. | 345/156 |
| 2009/0290787 | A1* | 11/2009 | Stevens et al. | 382/154 |

OTHER PUBLICATIONS

Boult et al., "Synergistic Smooth Surface Stereo", pp. 118-122, Columbia University Department of Computer Science, New York City, NY, Dec. 5, 1988.
Luo et al., "Reliable Omnidirectional Depth Map Generation for Indoor Mobile Robot Navigation Via a Single Perspective Camera", Advances in Artificial Reality and Tele-Existence Lecture Notes in Computer Science, vol. 4282, pp. 1283-1292, Springer-Verlag, Berlin Heidelberg, Jan. 1, 2006.
Dhond et al., "Structure from Stereo—A Review", IEEE Transactions on Systems, Man and Cybernetics, vol. 19, No. 6, pp. 1489-1510, IEEE Inc., New York, US, Dec. 1, 1989.

* cited by examiner

*Primary Examiner* — Brian Le
(74) *Attorney, Agent, or Firm* — Birch, Stewart, Kolasch & Birch, LLP

(57) ABSTRACT

Corresponding points corresponding to each other between each of a plurality of images photographed from different positions are searched for. When a plurality of corresponding points is searched out in a second image of the plurality of images for one target pixel in a first image of the plurality of images, at least partial subject shape around the target pixel is calculated based on distance values of a plurality of pixels around the target pixel, then a target distance value, which is a distance value of the target pixel, is calculated with respect to each of the plurality of corresponding points based on the target pixel and each of the plurality of corresponding points, and a valid corresponding point is determined from the plurality of corresponding points having a smallest difference from the subject shape.

4 Claims, 7 Drawing Sheets

| C4' |  | C1 |  | C3' |
|-----|-----|-----|-----|-----|
|  | B4' | B1 | B3' |  |
| C2 | B2 | A | B2' | C2' |
|  | B3 | B1' | B4 |  |
| C3 |  | C1' |  | C4 |

IMAGE PROCESSING APPARATUS, METHOD, AND PROGRAM

BACKGROUND OF THE INVENTION

1. Field of the Invention

The present invention relates to an image processing apparatus and method for calculating a parallax for generating a distance image that represents a stereoscopic shape of a subject based on a plurality of images. The invention also relates to a program for causing a computer to perform the image processing method.

2. Description of the Related Art

A method for generating a distance image that represents a stereoscopic shape of a subject is proposed. In the method, the subject is imaged by two or more cameras placed at different positions, then corresponding points, which are pixels corresponding to each other, between a plurality of images (a base image obtained by a base camera and a reference image obtained by a reference camera) obtained by the imaging are searched for (stereo matching) to calculate the positional difference (parallax) between the pixel in the base image and the pixel in the reference image corresponding to each other, and the distance from the base camera or reference camera to the point on the subject corresponding to the pixel is measured by applying the principle of triangulation to the parallax, whereby the distance image is generated.

Here, as illustrated in FIG. 3, when performing the stereo matching, a plurality of points, such as points P1, P2, P3, and so on, is present in real space along a visual line from point O1 which is projected onto pixel Pa in base image G1. Therefore, based on the fact that pixel Pa' in reference image G2 corresponding to pixel Pa is present on a straight line (epipolar line) representing projected images P1, P2, P3, and so on, the corresponding point which is a pixel in reference image G2 corresponding to pixel Pa is searched for.

In FIG. 3, point O1 is a viewpoint of the camera that obtains base image G1 and point O2 is a viewpoint of the reference camera that obtains reference image G2. Here, the viewpoint is the focal point of optical system of each camera. When performing the stereo matching in the manner as described above, correlation window W that includes pixel Pa, which is a corresponding point search target, is set on base image G1, then correlation window W which is identical to that set on the base image is moved along the epipolar line on reference image G2 to calculate the correlation value between each pixel in the correlation windows W on the respective images at each moved position, and the pixel located in the center of correlation window W in reference image G2 having a correlation value greater than or equal to a predetermined threshold value is obtained as the corresponding point of pixel Pa. Where base image G1 is used as the base, the corresponding point is searched for in reference image G2, and in this case, a corresponding pixel in base image G1 viewed from the pixel in reference image G2 can be regarded as a corresponding point of the pixel in reference image G2.

In the mean time, a distance image is generated for a variety of subjects, so that a plurality of similar objects may sometimes be included in the base image and reference image. Where a plurality of similar objects is included in the images, there may be a case in which a plurality of pixels (here, two pixels), Pb and Pc, is searched out as corresponding points with respect to one pixel Pa in base image G1, as shown in FIG. 5. Where a plurality of corresponding points is searched out in reference image G2 with respect to one pixel in base image G1, it is necessary to determine one of the corresponding points as a valid corresponding point for parallax calculation. Selection of a false corresponding point as the valid corresponding point, however, will result in incorrect parallax calculation.

Consequently, a method in which a corresponding point that minimizes the parallax is selected when a plurality of corresponding points is searched out with respect to one pixel is proposed as described, for example, in U.S. Pat. No. 6,366,691.

The method described in U.S. Pat. No. 6,366,691 allows the selection of a single corresponding point, but the corresponding point that minimizes the parallax is not always the correct corresponding point. Therefore, there may be a case in which the parallax can not be calculated correctly by the method described in U.S. Pat. No. 6,366,691.

The present invention has been developed in view of the circumstances described above, and it is an object of the present invention to enable accurate calculation of parallax when generating a distance image based on the parallax.

SUMMARY OF THE INVENTION

An image processing apparatus of the present invention is an apparatus for generating distance data based on a plurality of images photographed from different positions, the apparatus including:

a corresponding point searching unit for searching for corresponding points corresponding to each other between each of the plurality of images based on a correlation between each pixel in each of the plurality of images; and a corresponding point determination unit for, when a plurality of corresponding points is searched out in a second image of the plurality of images with respect to one target pixel in a first image of the plurality of images, calculating at least partial subject shape around the target pixel based on distance values of a plurality of pixels around the target pixel, calculating a target distance value, which is a distance value of the target pixel, with respect to each of the plurality of corresponding points based on the target pixel and each of the plurality of corresponding points, and determining a valid corresponding point from the plurality of corresponding points having a smallest difference from the subject shape.

The "subject shape" is a shape calculated based on distance values of a plurality of pixels around the target pixel and a distance value of the target pixel is not used. Accordingly, the target pixel portion on the calculated subject shape has an approximate value obtained from distance values of a plurality of pixels around the target pixel.

In the image processing apparatus according to the present invention, the corresponding point determination unit may be a unit that calculates an approximate curve representing a subject shape in a predetermined direction passing through the target pixel as the subject shape.

Here, the predetermined direction may be one of four directions of up-down, left-right, lower left to upper right, and lower right to upper left directions with reference to the target pixel.

Further, in the image processing apparatus according to the present invention, the corresponding point determination unit may be a unit that determines the predetermined direction based on correlations between a plurality of adjoining pixels in a plurality of directions passing through the target pixel and respective corresponding points thereof.

Here, the plurality of directions may be four directions of up-down, left-right, lower left to upper right, and lower right to upper left directions with reference to the target pixel.

Still further, in the image processing apparatus according to the present invention, the corresponding point determination unit may be a unit that determines, with respect to adjoining pixels in the predetermined direction, whether or not those having correlations with the corresponding points greater than or equal to a predetermined value are found as many as a required number for calculating the approximate curve and if the determination is positive, calculates the approximate curve based on the required number of pixels, while if the determination is negative, repeats the determination by including further adjoining pixels to the adjoining pixels in the predetermined direction until the determination becomes positive.

An image processing method of the present invention is a method for generating distance data based on a plurality of images photographed from different positions, the method including the steps of:

searching for corresponding points corresponding to each other between each of the plurality of images based on a correlation between each pixel in each of the plurality of images;

when a plurality of corresponding points is searched out in a second image of the plurality of images with respect to one target pixel in a first image of the plurality of images, calculating at least partial subject shape around the target pixel based on distance values of a plurality of pixels around the target pixel;

calculating a target distance value, which is a distance value of the target pixel, with respect to each of the plurality of corresponding points based on the target pixel and each of the plurality of corresponding points; and determining a valid corresponding point from the plurality of corresponding points having a smallest difference from the subject shape.

Where a corresponding point of a certain pixel (target pixel) is the true corresponding point, the distance value calculated based on the corresponding point substantially align with the subject shape around the target pixel. If the corresponding point is not the true corresponding point, however, the distance value calculated based on the corresponding point differs greatly from the subject shape around the target pixel.

In the image processing apparatus and method according to the present invention, if a plurality of corresponding points is searched out in a second image of a plurality of images with respect to one target pixel in a first image of the plurality of images, at least partial subject shape around the target pixel is calculated based on distance values of a plurality of pixels located around the target pixel, then based on the target pixel and each of the plurality of corresponding points, a target distance value, which is a distance value of the target pixel, is calculated with respect to each of the plurality of corresponding points, and a valid corresponding point is determined from the plurality of corresponding points having a smallest difference from the subject shape. This allows the valid corresponding point for parallax calculation to be determined accurately, which in turn allows parallax calculation and hence distance value calculation to be performed accurately.

Further, a valid corresponding point may be determined promptly with a less amount of calculations by calculating an approximate curve in a predetermined direction passing through the target pixel as a subject shape.

Still further, by determining a direction for calculating an approximate curve based on a plurality of adjoining pixels in a plurality of directions passing through the target pixel, and correlations between the plurality of pixels and respective corresponding point thereof, an approximate curve may be calculated in a direction in which the correlation is greater and distance value calculation is more accurate, so that a valid corresponding point may be determined more accurately.

Further, where a determination is made, with respect to adjoining pixels in the direction for calculating an approximate curve, whether or not those having correlations with the corresponding points greater than or equal to a predetermined threshold value are found as many as a required number for calculating the approximate curve, and if the determination is positive, the approximate curve is calculated based on the required number of pixels, while if the determination is negative, further adjoining pixels to the adjoining pixels in the direction for calculating the approximate curve are included and the determination is repeated until the determination becomes positive. This allows an approximate curve to be calculated based on pixels having greater correlations and accurate distance values, so that a valid corresponding point may be determined more accurately.

DESCRIPTION OF THE PREFERRED EMBODIMENTS

Figure 1:
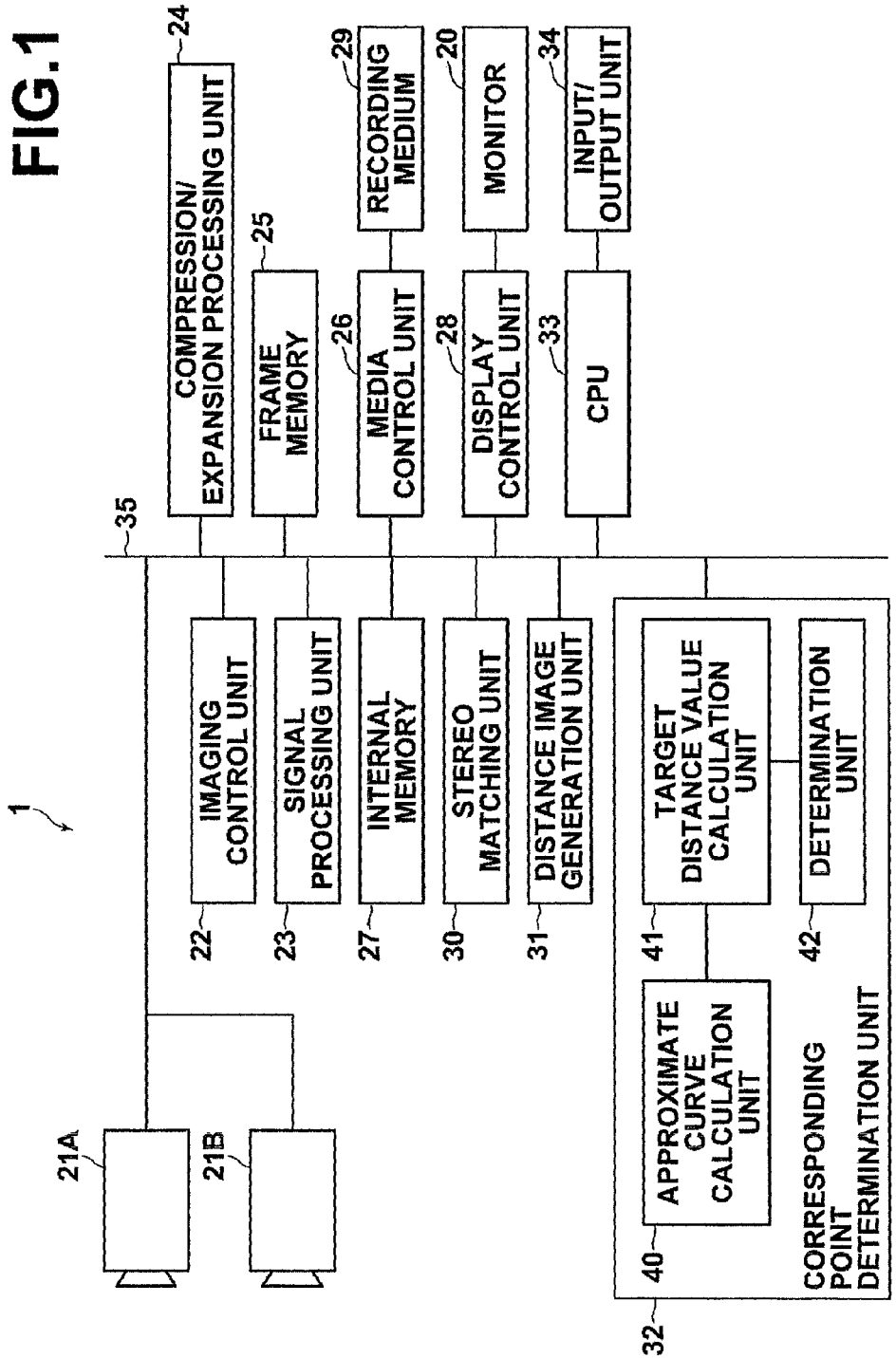
FIG. 1 is a schematic block diagram of a distance measuring system to which an image processing apparatus according to a first embodiment of the present invention is applied, illustrating an internal configuration thereof.

Hereinafter, exemplary embodiments of the present invention will be described with reference to the accompanying drawings. FIG. 1 is a schematic block diagram of a distance measuring system to which the image processing apparatus according to a first embodiment of the present invention is applied, illustrating the internal configuration thereof. As illustrated in FIG. 1, distance measuring system 1 according to the first embodiment includes two imaging units 21A, 21B, imaging control unit 22, signal processing unit 23, compression/expansion processing unit 24, frame memory 25, media control unit 26, internal memory 27, and display control unit 28.

Figure 2:
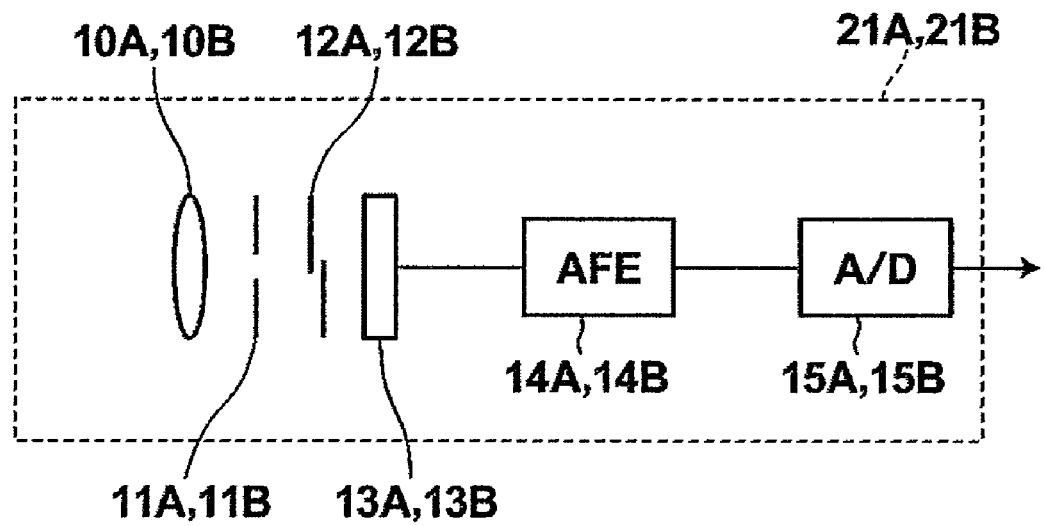
FIG. 2 illustrates a configuration of the imaging unit.

FIG. 2 illustrates a configuration of imaging units 21A, 21B. As illustrated in FIG. 2, imaging units 21A, 21B include lenses 10A, 10B, apertures 11A, 11B, shutters 12A, 12B, CCDs 13A, 13B, analog front ends (AFE) 14A, 14B, and A/D conversion units 15A, 15B respectively.

Each of lenses 10A, 10B includes a plurality of functional lenses, such as a focus lens for bringing a subject into focus, a zoom lens for realizing a zoom function and the like, and positions of the lenses are controlled by a not shown lens drive unit. In the present embodiment, the focal position is assumed to be fixed.

The aperture diameter of each of apertures 11A, 11B is controlled by a not shown aperture drive unit based on the aperture data obtained by AE processing. In the present embodiment, the aperture data are assumed to be fixed.

Each of shutters 12A, 12B is a mechanical shutter and driven by a not shown shutter drive unit according to the shutter speed obtained by AE processing. In the present embodiment, the shutter speed is assumed to be fixed.

Each of CCDs 13A, 13B includes a photoelectric surface having multitudes of light receiving elements disposed two-dimensionally, and a light image representing a subject is formed on the photoelectric surface and subjected to photo-electric conversion, whereby an analog image signal is obtained. A color filter having R, G, and B filters disposed regularly is provided in front of each of CCDs 13A, 13B.

AFEs 14A, 14B perform processing on the analog image signals outputted from CCDs 13A, 13B respectively for removing noise and adjusting gain (analog processing).

A/D conversion units 15A, 15B convert the analog image signals analog-processed by AFEs 14A, 14B respectively. Image data obtained by converting the analog image signals obtained by CCDs 13A, 13B of imaging units 21A, 21B are RAW data in which each pixel has R, G, and B density values. An image represented by image data obtained by imaging unit 21A is referred to as base image G1, and an image represented by image data obtained by imaging unit 21B is referred to as reference image G2.

Imaging control unit 22 controls imaging after the release button is depressed.

In the present embodiment, the focal position, aperture data, and shutter speed are fixed, but they may be set for each imaging by performing AF processing and AE processing.

Signal processing unit 23 performs correction processing on digital image data obtained by imaging unit 21A, 21B for correcting variations in the sensitivity distributions of the image data and distortions of the optical systems and paral-lelizing processing for parallelizing the two images. The unit further performs image processing on the parallelized images, such as white balance adjustment, tone correction, sharpness correction, color correction, and the like. Note that reference symbols G1, G2 used for the base image and reference image before subjected to the processing of signal processing unit 23 will also be used for the processed images. Further, the correction processing, parallelizing processing, and image processing are hereinafter collectively referred to as signal processing.

Compression/expansion unit 24 performs compression, for example, in JPEG compression format or the like on image data representing base image G1 and reference image G2 processed by signal processing unit 23 to generate an image file of distance image together with image data representing a distance image generated in a manner to be described later. That is, the image file includes the image data of base image G1, reference image G2, and the distance image. A header that includes auxiliary information, such as date and time of imaging and the like, is attached to the image file based on Exif format or the like.

Frame memory 25 is a work memory used when various types of processing, including the processing of signal processing unit 23, are performed on the image data representing base image G1 and reference image G2 obtained by imaging units 21A, 21B.

Media control unit 26 gains access to recording medium 29 and controls read/write operations for the image file of distance image.

Internal memory 27 has stored therein various constants to be set in distance measuring system 1, programs to be executed by CPU 33, and the like.

Display control unit 28 causes image data stored in frame memory 25 or an image recorded in recording medium 29 to be displayed on monitor 20.

Distance measuring system 1 further includes stereo matching unit 30, distance image generation unit 31, and corresponding point determination unit 32.

Figure 3:
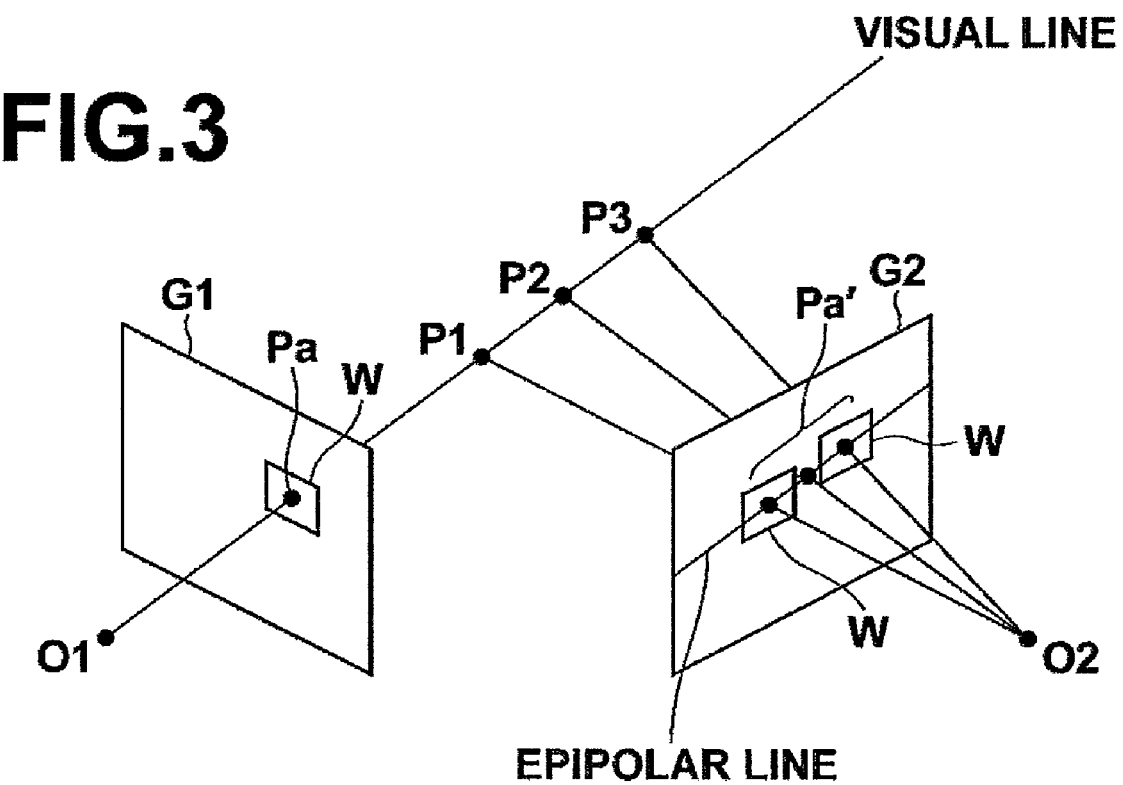
FIG. 3 illustrates a stereo matching method.

Stereo matching unit 30 searches on reference image G2 for a point corresponding to a point on base image G1 based on the fact that a plurality of points, such as points P1, P2, P3, and so on, is present in real space along a visual line from point O1 which is projected to pixel Pa on base image G1 and pixel Pa' on reference image G2 corresponding to pixel Pa is present on a straight line (epipolar line) representing projected images P1, P2, P3, and so on, as illustrated in FIG. 3. In FIG. 3, point O1 is a viewpoint of imaging unit 21A serving as a base camera and point O2 is a viewpoint of imaging unit 21B serving as a reference camera. Here, the viewpoints are the focal points of optical systems of imaging units 21A, 21B. When searching for corresponding points, it is preferable that base image G1 and reference image G2 subjected to the correction and parallelizing processing but not yet subjected to image processing be used, although the images subjected to image processing may also be used. Hereinafter, description will be made of a case in which base image G1 and reference image G2 not yet subjected to the image processing are used in the search for corresponding points.

More specifically, when searching for corresponding points, stereo matching unit 30 moves predetermined correlation window W along the epipolar line to calculate the correlation between pixels in the correlation windows W on base image G1 and reference image G2 at each moved position, and determines the center pixel of correlation window W on reference image G2 at a position where the correlation value in reference image G2 is greater than or equal to a predetermined threshold value as the corresponding point corresponding to pixel Pa in base image G1. As for the correlation evaluation value for evaluating the correlation, the sum of absolute differences, the reciprocal value of the sum of squared differences, or the like may be used. In this case, a smaller correlation evaluation value represents a larger correlation. For a pixel in base image G1 corresponding to a pixel in reference image G2 is the corresponding point viewed from the pixel in reference image G2. In the present embodiment, either of the pixels is referred to as a corresponding point.

Figure 4:
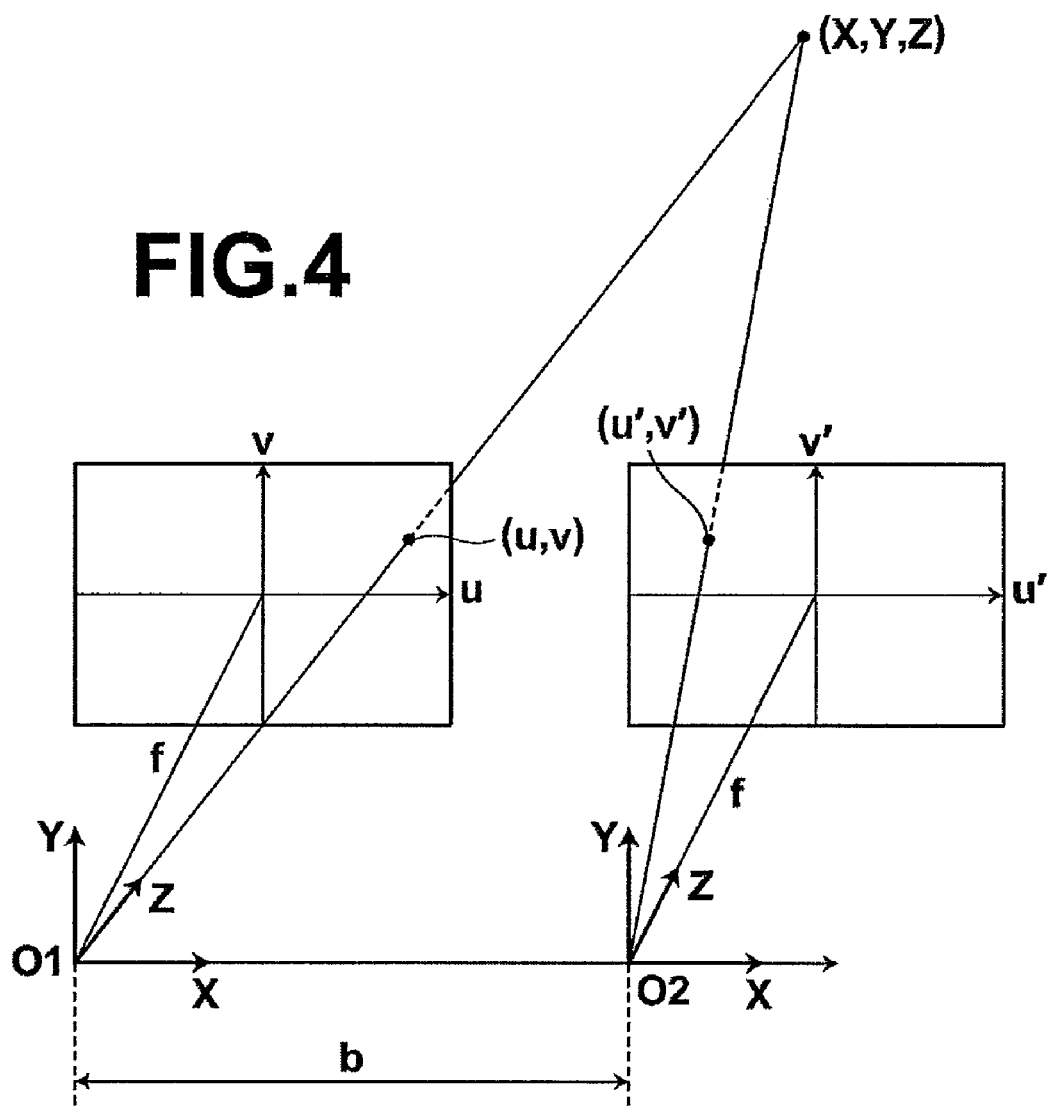
FIG. 4 illustrates the positional relationship between a base image and a reference image after parallelized.

FIG. 4 illustrates the positional relationship between a base image and a reference image after parallelizing processing. As illustrated in FIG. 4, the origin of image planes, which are planes in imaging units 21A, 21B where base image G1 and reference image G2 are obtained, is the intersecting point between the optical axes of imaging units 21A, 21B. Coordinate systems of imaging units 21A, 21B on the image planes are defined as (u, v) and (u', v') respectively. Here, the optical axes of imaging units 21A, 21B become parallel to each other by the parallelizing processing, so that u-axis and u'-axis in the imaging planes are oriented in the same direction on the same straight line. Further, the epipolar line on reference image G2 becomes parallel to u'-axis by the parallelizing processing, so that u-axis on reference image G1 corresponds to the direction of the epipolar line on reference image G2.

Here, the focal length of imaging units 21A, 21B is assumed to be f, and the baseline length to be b. The focal length f and baseline length b are calculated in advance as calibration parameters and stored in internal memory 27. In this case, a position (X, Y, Z) in three-dimensional space is represented by Formulae (1) to (3) below when the coordinate system of imaging unit 21A is used as the base.

$$X = b \cdot u/(u-u') \quad (1)$$

$$Y = b \cdot v/(u-u') \quad (2)$$

$$Z = b \cdot f/(u-u') \quad (3)$$

where, u−u' is the shifted amount in the horizontal direction (parallax) between projected points on the image planes of imaging units 21A, 21B. Formula (3) indicates that distance Z that represents the depth is inversely proportional to the parallax. X, Y, and Z calculated in the manner as described above are referred to as the distance values. Distance values X, Y are positional information indicating the position of the pixel, and distance value Z is the distance, i.e., depth information. Note that distance values X, Y, and Z are calculated in an area common to base image G1 and reference image G2. Therefore, distance values X, Y, and Z are converted from the values in the coordinate system of imaging unit 21A to the values in a coordinate system with its origin at the intermediate position between the origins of image planes of imaging units 21A, 21B in order to facilitate the subsequent processing. Hereinafter, the description will be made on the assumption that the referent of coordinate system means the coordinate system with its origin at the intermediate position between the origins of image planes of imaging units 21A, 21B.

Distance image generation unit 31 calculates the parallax (u−u') using the corresponding point obtained by stereo matching unit 30, then calculates distance values X, Y, and Z representing distances from imaging unit 21A, 21B to the subject by Formulae (1) to (3) above, and generates image data of distance images with the calculated distance values X, Y, and Z as the pixel value of each image. Here, distance value Z of each pixel of the distance images represents the distances from imaging units 21A, 21B to the subject.

In the first embodiment described above, correlation window W is moved along the epipolar line to search for a corresponding point, but an arrangement may be adopted in which correlation window W is moved along the epipolar line to search for a corresponding point first, then correlation window W is moved irrespective of the epipolar line direction within an area of a predetermined range around the searched out corresponding point to further calculate correlations, thereby searching for a corresponding point having a greater correlation value. Alternatively, the corresponding point may be searched for without regarding the epipolar line at all.

Figure 5:
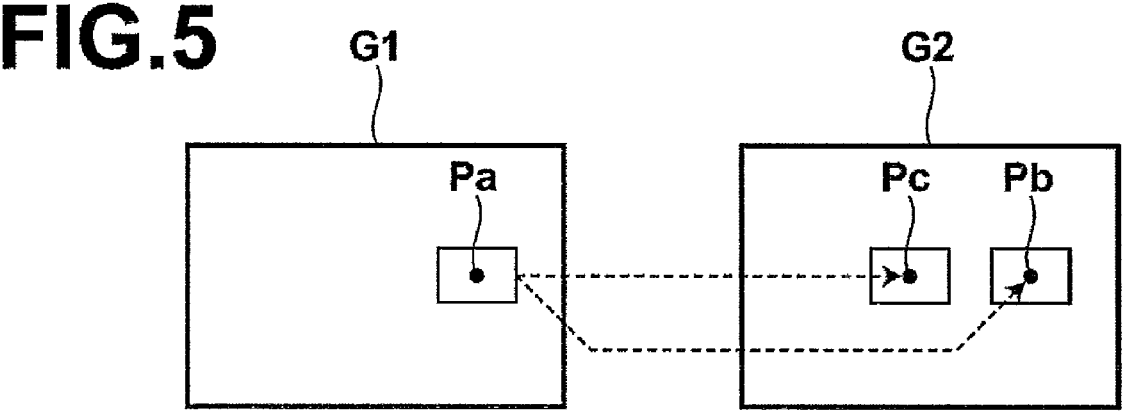
FIG. 5 illustrates the case in which two pixels in a reference image are searched out as corresponding points with respect to one pixel in a base image.

In the mean time, a distance image is generated for a variety of subjects, so that a plurality of similar objects may sometimes be included in the base image and reference image. Where a plurality of similar objects is included in the images, there may be a case in which a plurality of pixels (here, two pixels), Pb and Pc, is searched out as the corresponding points with respect to one pixel Pa in base image G1, as shown in FIG. 5. Where a plurality of corresponding points is searched out in reference image G2 with respect to one pixel in base image G1, it is necessary to determine one of the corresponding points as a valid corresponding point for the parallax calculation. Selection of a false corresponding point as the valid corresponding point, however, will result in incorrect parallax calculation.

In the first embodiment, if a plurality of corresponding points is searched out in reference image G1 with respect to one pixel in base image G1 by stereo matching unit 30, a valid corresponding point is determined by corresponding point determination unit 32. Corresponding point determination unit 32 includes approximate curve calculation unit 40, target distance value calculation unit 41, and determination unit 42. Processing performed by approximate curve calculation unit 40, target distance value calculation unit 41, and determination unit 42 will be described later.

CPU 33 controls each unit of distance measuring system 1 according to signals from input/output unit 34 that includes the release button.

Data bus 35 connects each unit of distance measuring system 1 and CPU 33 and various types of data and information in distance measuring system 1 are exchanged through the bus.

Figure 6:
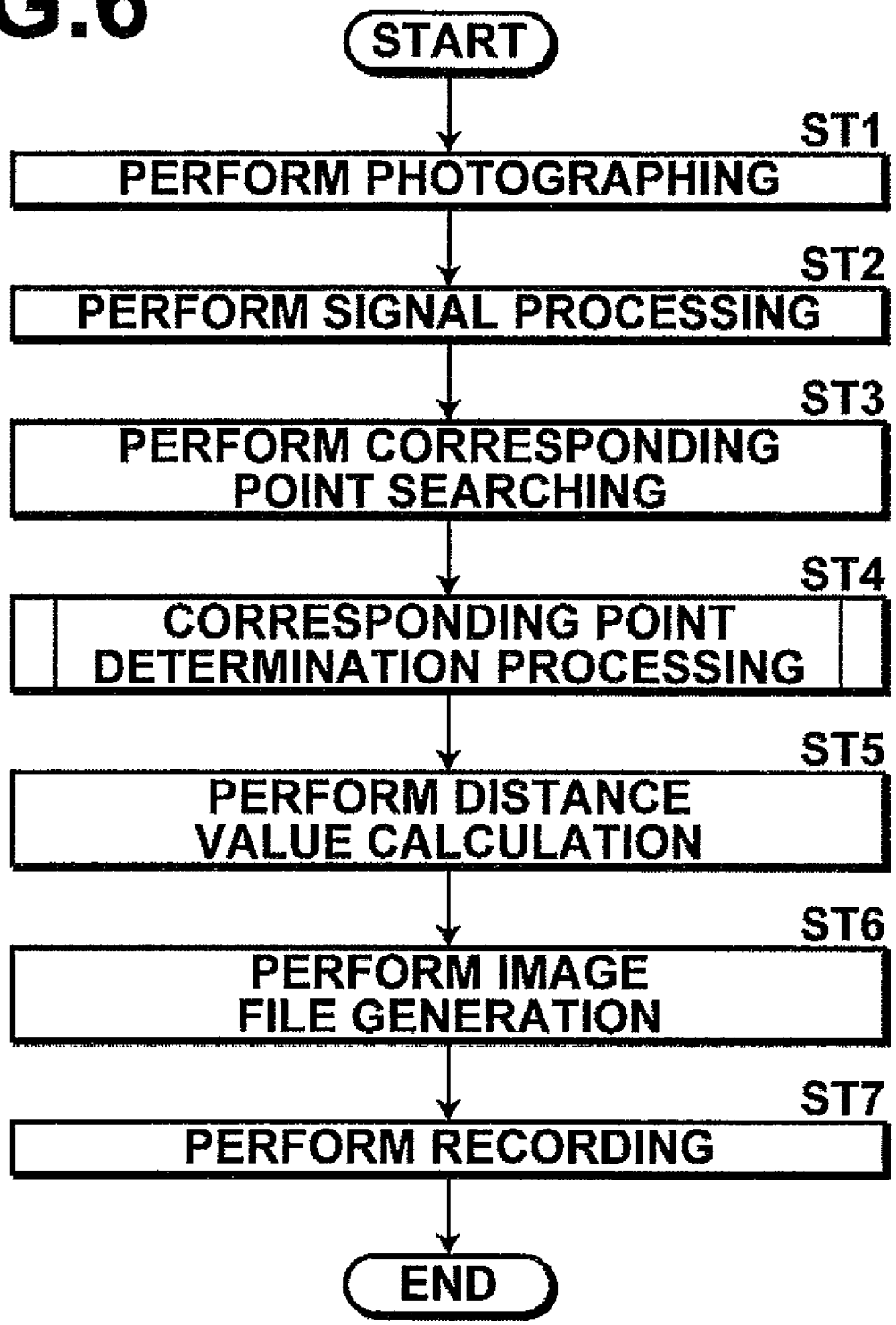
FIG. 6 is a flowchart illustrating processing performed in the first embodiment.

Processing performed in the first embodiment will now be described. FIG. 6 is a flowchart illustrating the processing performed in the first embodiment. Here, processing following an instruction to start imaging is issued by fully depressing the release button will be described.

CPU 33 starts the processing when the release button is fully depressed, and imaging units 21A, 21B photograph a subject in response to an instruction from CPU 33 (step ST1). Further, signal processing unit 23 performs correction processing, parallelizing processing, and image processing (signal processing) on the acquired image data to obtain base image G1 and reference image G2 (step ST2), and stereo matching unit 30 searches for a corresponding point in reference image corresponding to each pixel in base image G1 (step ST3). Then, corresponding point determination unit 32 performs corresponding point determination processing which is processing for determining a valid corresponding point (step ST4).

Figure 7:
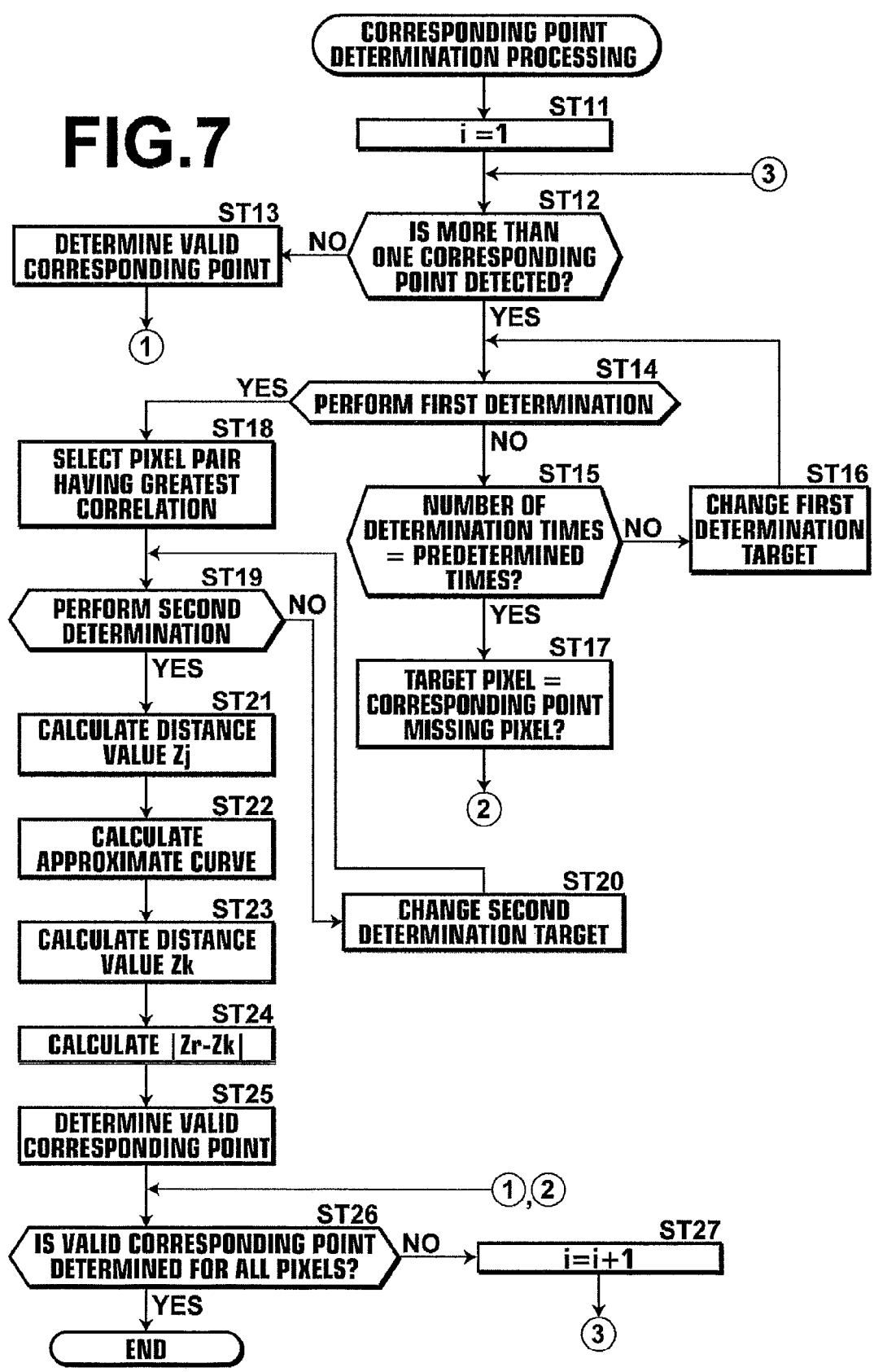
FIG. 7 is a flowchart illustrating corresponding point determination processing in the first embodiment.

FIG. 7 is a flowchart illustrating the corresponding point determination processing performed in the first embodiment. Here, the description will be made on the assumption that corresponding points are sequentially determined with respect to pixels in base image G1 from the pixel in the upper left corner thereof. Although the pixel position on base image G1 is two-dimensional, but represented one-dimensionally in order to simplify the description. Corresponding point determination unit 32 selects the first pixel as the target pixel which is a target for corresponding point determination processing (i=1, i is the position of the pixel in the base image, step ST11), and determines if a plurality of corresponding points is searched out with respect to the target pixel (step ST12). If step ST12 is negative, then it means that one corresponding point is searched out, so that the corresponding point is determined as a valid corresponding point (step ST13), and the processing proceeds to step ST26.

Figures 8, 9:
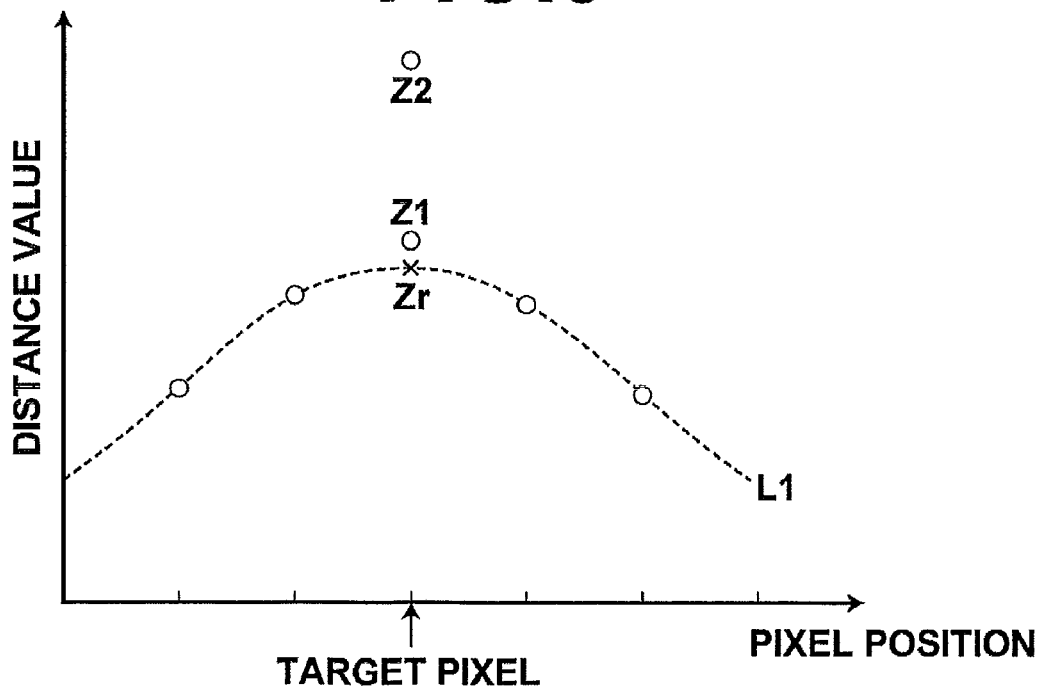
FIG. 8 illustrates pixels around a target pixel.
FIG. 9 illustrates how to determine a corresponding point.

If step ST12 is positive, corresponding point determination unit 32 determines if valid corresponding points are determined with respect to adjoining pixels at least in one of four directions centered on the target pixel, that is, up-down, left-right, lower left to upper right, and lower right to upper left directions (first determination, step ST14). That is, as illustrated in FIG. 8, corresponding point determination unit 32 determines whether or valid corresponding points are determined for at least one of the directions of pixels B1, B1', pixels B2, B2', pixels B3, B3', and pixels B4, B4' adjoining the target pixel A in up-down, left-right, lower left to upper right, and lower right to upper left directions respectively.

If step ST14 is negative, a determination is made if the number of times of the first determination performed corresponds to predetermined times (for example, 10 times) (step ST15). If step ST15 is negative, the targets of the first determination are changed to pixels adjoining the outside of the adjoining pixels for a direction where valid corresponding points are not yet determined (step ST16), and the processing returns to step ST14. That is, if the direction where valid corresponding points are not yet determined is the up-down direction in FIG. 8, the determination targets are changed to pixels C1, C1' adjoining the outside of respective pixels B1, B1' adjoining target pixel A in the up-down direction. If the direction where valid corresponding points are not yet determined is the left-right direction in FIG. 8, the determination targets are changed to pixels C2, C2' adjoining the outside of respective pixels B2, B2' adjoining target pixel A in the left-right direction. If the direction where valid corresponding points are not yet determined is the lower left to upper right direction in FIG. 8, the determination targets are changed to pixels C3, C3' adjoining the outside of respective pixels B3, B3' adjoining target pixel A in the lower left to upper right direction. If the direction where valid corresponding points are not yet determined is the lower right to upper left direction in FIG. 8, the determination targets are changed to pixels C4, C4' adjoining the outside of respective pixels B4, B4' adjoining target pixel A in the lower left to upper right direction. Steps ST14 to ST16 are repeated until pixels for which valid corresponding points are determined are detected in at least one of the four directions.

If step ST15 is positive, it means that a valid corresponding point can not be determined, so that the target pixel is set as a corresponding point missing pixel (step ST17), and the processing proceeds to step ST26 to be described later. Note that the distance value will not be calculated for the corresponding point missing pixel.

If step ST14 is positive, a pixel pair having a greatest correlation obtained when the corresponding points thereof are searched for is selected from adjoining pixel pairs in the directions in which valid corresponding points are determined (step ST18). For example, where valid corresponding points are determined for all of the adjoining pixel pairs in the four directions passing through the target pixel, one of the directions of pixel pair having a greatest sum of correlation (i.e., having a smallest sum of correlation evaluation value) obtained when the corresponding points thereof are searched for is selected from the four pixel pairs, (B1, B1'), (B2, B2'), (B3, B3'), and (B4, B4') shown in FIG. 8. If valid correlation points are determined only in one direction, the direction is selected.

Next, corresponding point determination unit 32 determines, with respect to the adjoining pixels in the selected direction at the target pixel, if the number of pixels having correlations greater than or equal to threshold value Th1 when correlation points thereof are searched for reaches a required number for calculating an approximate curve, to be described later (second determination, step ST19). For example, four pixels may be used as the number of pixels required for calculating an approximate curve, but not limited to this. If step ST19 is negative, a change is made to include pixels adjoining further outside of the target pixel in the selected direction in the second determination of step ST19 (step ST20), and the processing returns to step ST19.

If step ST19 is positive, approximate curve calculation unit of corresponding point determination unit 32 calculates distance values Zj (j represents the number of pixels required for calculating an approximate curve) with respect to the number of pixels required for calculating the approximate curve in the selected direction (step ST21), and calculates an approximate curve representing a subject shape at the target pixel and around thereof from calculated distance values Zj (step ST22). Further, from the target pixel and each of a plurality of corresponding points corresponding to the target pixel, target distance value calculation unit 41 calculates a target distance value Zk (k represents the number of corresponding points), which is a distance value of the target pixel, with respect to each of the corresponding points (step ST23). For example, where two corresponding points corresponding to the target pixel are searched out, two target distance values Z1, Z2 are calculated.

Then, determination unit 42 of corresponding point determination unit 32 calculates an absolute difference between distance value Zr corresponding to the target pixel on the approximate curve and each of target distance values Zk (step ST24), and determines a corresponding point with calculated target distance value Zk having a smallest absolute difference as the valid corresponding point (step ST25).

That is, as illustrated in FIG. 9, when approximate curve L1 is calculated using four pixels adjoining the target pixel and two target distance values Z1, Z2 are calculated, the difference between distance value Zr of the target pixel and target distance value Z1 is smaller than that between distance value Zr and target distance value Z2, so that the corresponding point for which target distance value Z1 is calculated is determined as the valid corresponding point.

Then, corresponding point determination unit 32 determines if the valid corresponding points are determined for all of the pixels (step ST26). If step ST26 is negative, the next pixel is selected as the target pixel (step ST27), and the processing returns to step ST12. If step ST26 is positive, the corresponding point determination processing is terminated.

Now returning to FIG. 6, distance image generation unit 31 calculates distance values X, Y, and Z based on the valid corresponding points (step ST5). Then, compression/expansion processing unit 24 generates an image file of distance image which includes image data of base image G1 and reference image G2, and image data of a distance image formed of distance values (step ST6). Thereafter, media control unit 26 records the image file in recording medium 29 in response to the instruction from CPU 33 (step ST7, and the processing is terminated.

Here, where a corresponding point of the target pixel is the true corresponding point, the distance value calculated based on the corresponding point substantially align with the subject shape around the target pixel. If the corresponding point is not the true corresponding point, however, the distance value calculated based on the corresponding point differs greatly from the subject shape around the target pixel.

In the first embodiment, if a plurality of corresponding points is searched out in reference image G2 with respect to one target pixel in base image G1, an approximate curve representing a subject shape at the target pixel and around thereof is calculated based on distance values of a plurality of pixels located around the target pixel, then based on the target pixel and each of the plurality of corresponding points, a target distance value, which is a distance value of the target pixel, is calculated with respect to each of the plurality of corresponding points, and the corresponding point with the calculated target distance value having a smallest difference from the approximate curve is determined as a valid corresponding point. This allows the valid corresponding point for parallax calculation to be determined accurately, which in turn allows parallax calculation and hence distance value calculation to be performed accurately.

Further, a valid corresponding point may be determined promptly with a less amount of calculations by calculating an approximate curve in a predetermined direction passing through the target pixel as a subject shape.

Still further, by determining a direction for calculating an approximate curve based on a plurality of adjoining pixels in a plurality of directions passing through the target pixel, and correlations between the plurality of pixels and respective corresponding points thereof, an approximate curve may be calculated in a direction in which the correlation is greater and distance value calculation is more accurate, so that the valid corresponding point may be determined more accurately.

Further, a determination is made, with respect to the adjoining pixels in the direction for calculating an approximate curve, if the number of pixels having correlations with the corresponding points greater than or equal to predetermined threshold value Th1 reaches a required number for calculating an approximate curve, and if the determination is positive, the approximate curve is calculated based on the required number of pixels, while if the determination is negative, further adjoining pixels to the adjoining pixels in the direction for calculating an approximate curve are included and the determination is repeated until the determination becomes positive. This allows an approximate curve to be calculated based on pixels having greater correlations and accurate distance values, so that a valid corresponding point may be determined more accurately.

Next, a second embodiment of the present invention will be described. The configuration of a distance measuring system to which the image processing apparatus according to the second embodiment is applied is identical to that of the distance measuring system in the first embodiment, so that it will not be elaborated upon further here. The second embodiment differs from the first embodiment only in the processing performed by corresponding point determination unit 32.

In the second embodiment, the second determination performed in the first embodiment is not performed.

Figure 10:
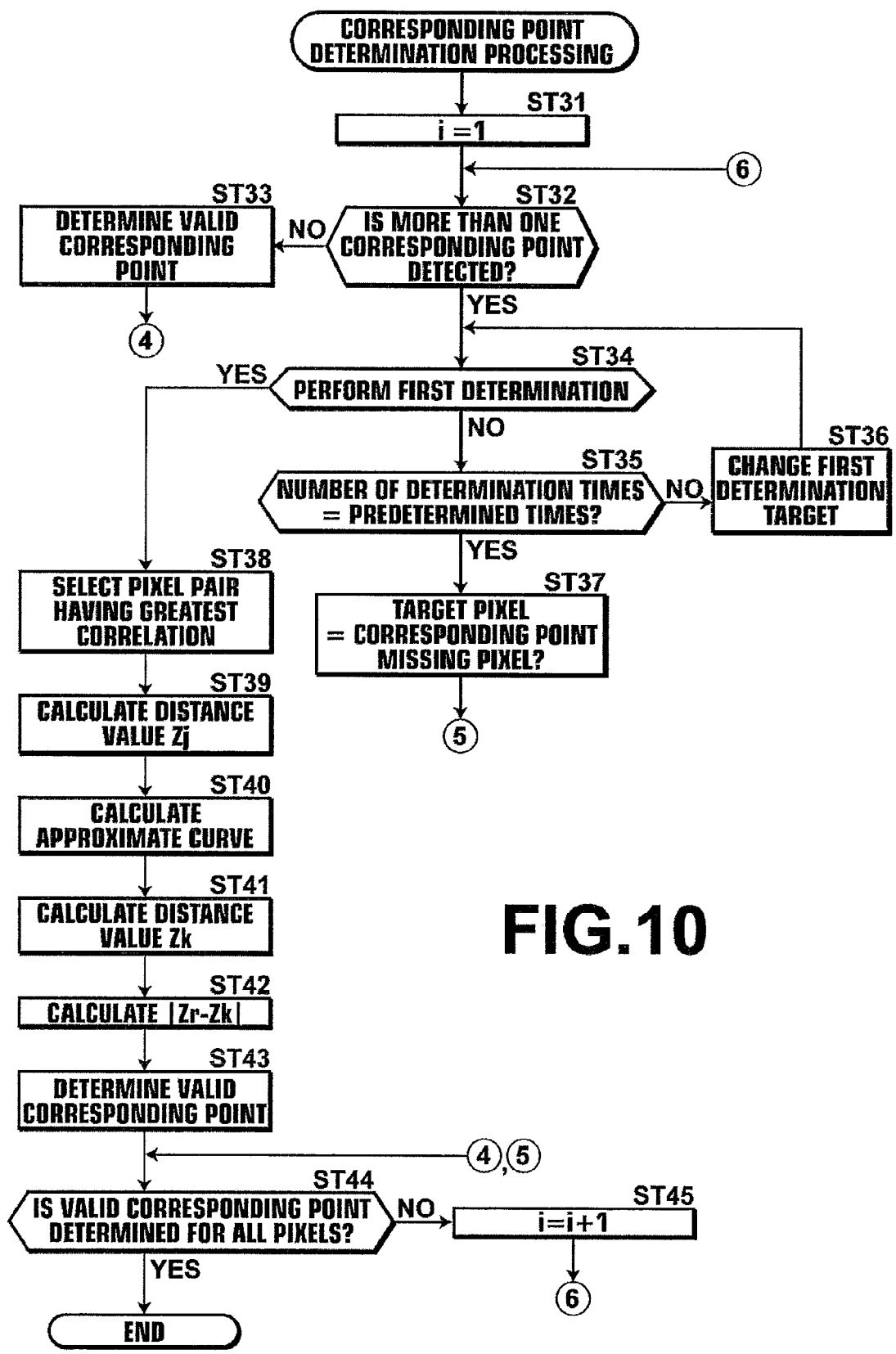
FIG. 10 is a flowchart illustrating corresponding point determination processing in a second embodiment.

Processing performed in the second embodiment will now be described. FIG. 10 is a flowchart illustrating corresponding point determination processing performed in the second embodiment. Here, the description will be made on the assumption that corresponding points are sequentially determined with respect to pixels in base image G1 from the pixel in the upper left corner thereof. Although the pixel position in base image G1 is two-dimensional, but represented one-dimensionally in order to simplify the description. Corresponding point determination unit 32 selects the first pixel as the target pixel which is a target for corresponding point determination processing (i=1, i is the position of the pixel in the base image, step ST31), and determines if a plurality of corresponding points is searched out with respect to the target pixel (step ST32). If step ST32 is negative, then it means that one corresponding point is searched out, so that the corresponding point is determined as a valid corresponding point (step ST33), and the processing proceeds to step ST44.

If step ST32 is positive, corresponding point determination unit 32 determines if valid corresponding points are determined with respect to adjoining pixels at least in one of four directions centered on the target pixel, that is, up-down, left-right, lower left to upper right, and lower right to upper left directions (first determination, step ST34).

If step ST34 is negative, a determination is made if the number of times of the first determination performed corresponds to predetermined times (for example, 10 times) (step ST35). If step ST35 is negative, the targets of the first determination are changed to the pixels adjoining the outside of the adjoining pixels in a direction where valid corresponding points are not yet determined (step ST36), and the processing returns to step ST34. Steps ST34 to ST36 are repeated until pixels for which valid corresponding points are determined are detected in at least one of the four directions.

If step ST35 is positive, it means that a valid corresponding point can not be determined, so that the target pixel is set as a corresponding point missing pixel (step ST37), and the processing proceeds to step ST44 to be described later.

If step ST34 is positive, a pixel pair having a greatest correlation obtained when the corresponding points thereof are searched for is selected from adjoining pixel pairs in the directions in which valid corresponding points are determined (step ST38). If valid correlation points are determined only in one direction, the direction is selected.

Next, approximate curve calculation unit 40 of corresponding point determination unit 32 calculates distance values Zj (j represents the number of pixels required for calculating an approximate curve) with respect to the number of pixels required for calculating the approximate curve in the selected direction (step ST39), and calculates the approximate curve representing a subject shape at the target pixel and around thereof from calculated distance values Zj (step ST40). Further, from the target pixel and each of a plurality of corresponding points corresponding to the target pixel, target distance value calculation unit 41 calculates target distance values Zk (k represents the number of corresponding points), which are distance values of the target pixel, for the respective corresponding points (step ST41). For example, where two corresponding points corresponding to the target pixel are searched out, two target distance values Z1, Z2 are calculated.

Then, determination unit 42 of corresponding point determination unit 32 calculates an absolute difference between distance value Zr corresponding to the target pixel on the approximate curve and each of target distance values Zk (step ST42), and determines a corresponding point with calculated target distance value Zk having a smallest absolute difference as the valid corresponding point (step ST43).

Then, corresponding point determination unit 32 determines if the valid corresponding points are determined for all of the pixels (step ST44). If step ST44 is negative, the next pixel is selected as the target pixel (step ST45), and the processing returns to step ST32. If step ST44 is positive, the corresponding point determination processing is terminated.

As described above, in the second embodiment, the valid corresponding point may be determined accurately, although the accuracy is slightly degraded in comparison with the first embodiment.

In the first and second embodiments, one of four directions passing through a target pixel is selected to calculate an approximate curve, but the direction for calculating the approximate curve may be predetermined. This allows the approximate curve to be calculated promptly, although the accuracy is slightly degraded.

Further, in the first and second embodiments, an approximate curve is calculated for one direction passing through a target pixel, but an approximate curved surface representing a subject shape at the target pixel and around thereof may be calculated based on the distance values of a plurality of pixels in a predetermined area passing through the target pixel, and the valid corresponding point may be determined based on the difference between the approximate curved surface and each of the target distance values.

Still further, in the first and second embodiments, corresponding points are searched for and determined, and a distance image is generated in the distance measuring system 1, but a configuration may be adopted in which an image processing apparatus that includes stereo matching unit 30, distance image generation unit 31, and corresponding point determination unit 32 is provided outside of the system 1. In this case, image data of base image G1 and reference image G2 are outputted from input/output unit 34 to the external image processing apparatus, whereby corresponding point searching, corresponding point determination, and distance image generation are performed in the apparatus.

Further, in the first and second embodiments, a distance image is generated using base image G1 and reference image G2 obtained by imaging units 21A, 21B in distance measuring system 1, but a configuration may be adopted in which imaging units 21A, 21B are provided separately from distance measuring system 1. In this case, base image G1 and reference image G2 obtained by imaging units 21A, 21B are inputted to the distance measuring system, and a distance image is generated using inputted base image G1 and reference image G2.

Still further, in the first and second embodiments, two imaging units are provided in distance measuring system 1 and a distance image is generated using two images of base image G1 and reference image G2, but the present invention may be applied to a case in which three or more imaging units are provided and a distance image is generated using two or more reference images.

So far embodiments of the present invention have been described, but a program for causing a computer to function as means corresponding to stereo matching unit 30, distance image generation unit 31, and corresponding point determination unit 32, thereby performing processing like that shown in FIGS. 6, 7, and 10 is another embodiment of the present invention. Further, a computer readable recording medium on which is recorded such a program is still another embodiment of the present invention.

What is claimed is:

1. An image processing apparatus for generating distance data based on a plurality of images photographed from different positions, the apparatus comprising:
   a corresponding point searching unit for searching for corresponding points corresponding to each other between each of the plurality of images based on a correlation between each pixel in each of the plurality of images; and
   a corresponding point determination unit for, when a plurality of corresponding points is searched out in a second image of the plurality of images with respect to one target pixel in a first image of the plurality of images, calculating at least partial subject shape around the target pixel based on distance values of a plurality of pixels around the target pixel, calculating a target distance value, which is a distance value of the target pixel, with respect to each of the plurality of corresponding points based on the target pixel and each of the plurality of corresponding points, and determining a valid corresponding point from the plurality of corresponding points having a smallest difference from the subject shape,
   wherein the corresponding point determination unit is a unit that calculates an approximate curve representing a subject shape in a predetermined direction passing through the target pixel as the subject shape,
   wherein the corresponding point determination unit is a unit that determines, with respect to adjoining pixels in the predetermined direction, whether or not those having correlations with the corresponding points greater than or equal to a predetermined value are found as many as a required number for calculating the approximate curve and if the determination is positive, calculates the approximate curve based on the required number of pixels, while if the determination is negative, repeats the determination by including further adjoining pixels to the adjoining pixels in the predetermined direction until the determination becomes positive.

2. An image processing method for generating distance data based on a plurality of images photographed from different positions, the method comprising a computer to perform the steps of:
   searching for corresponding points corresponding to each other between each of the plurality of images based on a correlation between each pixel in each of the plurality of images;
   when a plurality of corresponding points is searched out in a second image of the plurality of images with respect to one target pixel in a first image of the plurality of images, calculating at least partial subject shape around the target pixel based on distance values of a plurality of pixels around the target pixel;
   calculating a target distance value, which is a distance value of the target pixel, with respect to each of the plurality of corresponding points based on the target pixel and each of the plurality of corresponding points; and
   determining a valid corresponding point from the plurality of corresponding points having a smallest difference from the subject shape,
   wherein the step of searching for corresponding points calculates an approximate curve representing a subject shape in a predetermined direction passing through the target pixel as the subject shape,
   wherein the determining step determines, with respect to adjoining pixels in the predetermined direction, whether or not those having correlations with the corresponding points greater than or equal to a predetermined value are found as many as a required number for calculating the approximate curve and if the determination is positive, calculates the approximate curve based on the required number of pixels, while if the determination is negative, repeats the determination by including further adjoining pixels to the adjoining pixels in the predetermined direction until the determination becomes positive.

3. The image processing apparatus as claimed in claim 1, wherein the corresponding point determination unit is a unit that determines the predetermined direction based on correlations between a plurality of adjoining pixels in a plurality of directions passing through the target pixel and respective corresponding points thereof.

4. A non-transitory computer readable recording medium on which is recorded a program for causing a computer to perform an image processing method for generating distance data based on a plurality of images photographed from different positions, the program including the steps of:
   searching for corresponding points corresponding to each other between each of the plurality of images based on a correlation between each pixel in each of the plurality of images;
   when a plurality of corresponding points is searched out in a second image of the plurality of images with respect to one target pixel in a first image of the plurality of images, calculating at least partial subject shape around the target pixel based on distance values of a plurality of pixels around the target pixel;
   calculating a target distance value, which is a distance value of the target pixel, with respect to each of the plurality of corresponding points based on the target pixel and each of the plurality of corresponding points; and
   determining a valid corresponding point from the plurality of corresponding points having a smallest difference from the subject shape,
   wherein the step of searching for corresponding points calculates an approximate curve representing a subject shape in a predetermined direction passing through the target pixel as the subject shape, wherein the determining step determines, with respect to adjoining pixels in the predetermined direction, whether or not those having correlations with the corresponding points greater than or equal to a predetermined value are found as many as a required number for calculating the approximate curve and if the determination is positive, calculates the approximate curve based on the required number of pixels, while if the determination is negative, repeats the determination by including further adjoining pixels to the adjoining pixels in the predetermined direction until the determination becomes positive.

* * * * *